(No Model.) 2 Sheets—Sheet 1.

A. N. PARRY.
CARRIAGE.

No. 482,189. Patented Sept. 6, 1892.

Witnesses
H. C. Renick Jr.
Eben Hutchinson Jr.

Inventor
Augustus N. Parry
per T. W. Porter Atty (No Model.) 2 Sheets—Sheet 2.

A. N. PARRY.
CARRIAGE.

No. 482,189. Patented Sept. 6, 1892.

Witnesses:
H. C. Remick Jr.
Eben Hutchinson Jr.

Inventor:
Augustus N. Parry
per T. W. Porter Atty

UNITED STATES PATENT OFFICE.

AUGUSTUS N. PARRY, OF AMESBURY, MASSACHUSETTS.

CARRIAGE.

SPECIFICATION forming part of Letters Patent No. 482,189, dated September 6, 1892.

Application filed June 13, 1892. Serial No. 436,437. (No model.)

*To all whom it may concern:*

Be it known that I, AUGUSTUS N. PARRY, of Amesbury, in the county of Essex and State of Massachusetts, have invented a new and useful Improvement in Carriages, which will, in connection with the accompanying drawings, be hereinafter fully described, and specifically defined in the appended claim.

Figure 1:
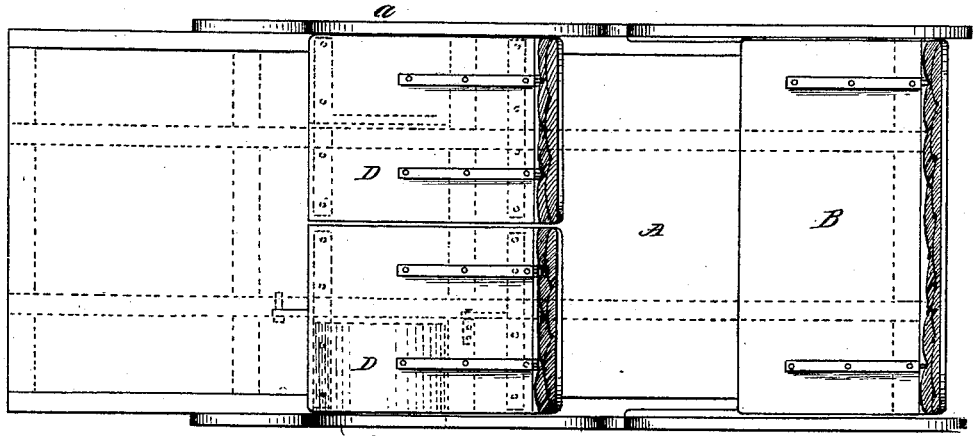
Figure 2:
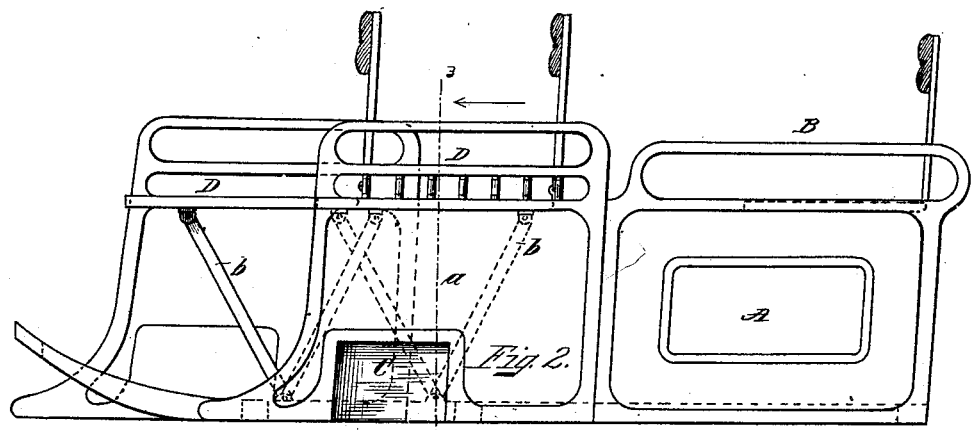
Figure 3:
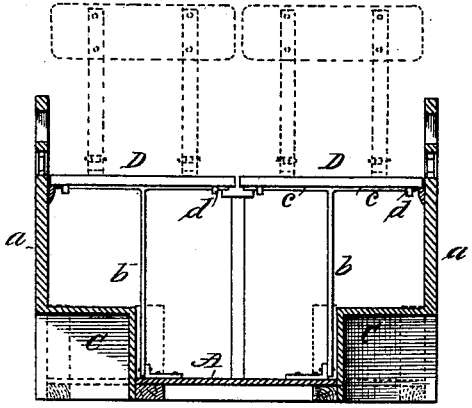
Figure 4:
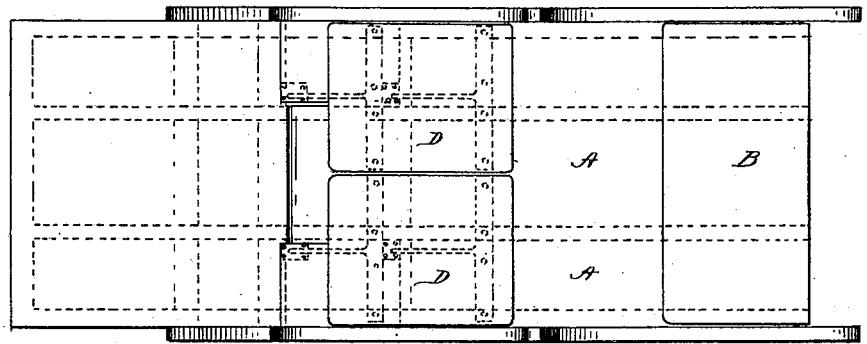
Figure 5:
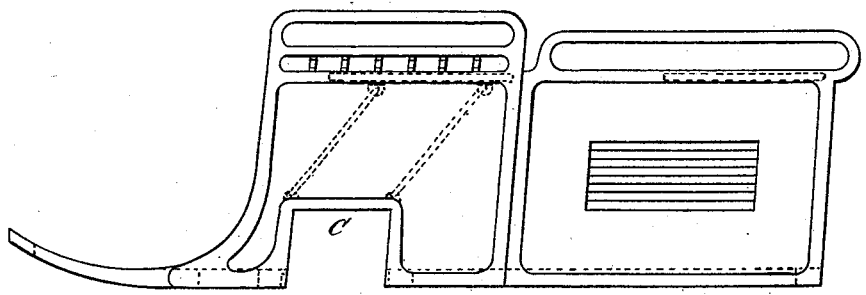
Figure 6:
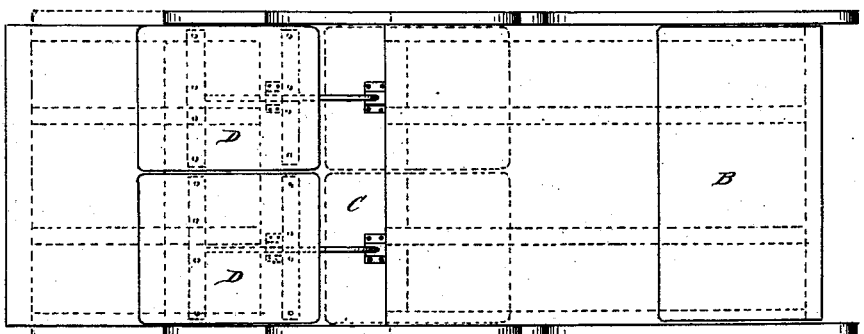
Figure 7:
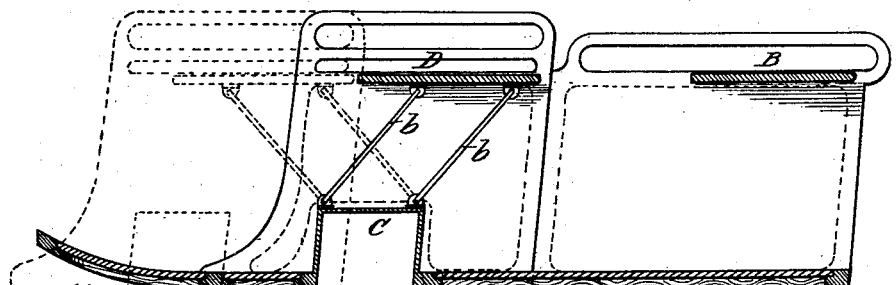

In said drawings, Figure 1 is a top plan view of a carriage body and seats, the body being formed level with recesses in the sides to facilitate entering and leaving the vehicle, and the short wheel-houses that cover said recesses being secured to that portion of the side panels that is secured to the front seat, which seat is formed and arranged to be jumped forward instead of turning forward. Fig. 2 is a side elevation of Fig. 1, the farther seat being shown as in the act of being jumped forward. Fig. 3 is a vertical section on line 3, Fig. 2. Fig. 4 shows a body and seats, the body being formed with a wheel-house in its central portion and with recesses in its side portions to facilitate entering and leaving the vehicle, and the front seat being formed with short sections of the wheel-house secured to its side panels that coincide with and supplement the central portion that is formed with the body and said front seat being constructed and arranged to be jumped forward. Fig. 5 is a side elevation of Fig. 4. Fig. 6 is a top plan view of a body and seats, the body being formed with a wheel-house extending entirely across it, and the front seat having a corresponding portion of the side panels cut away to correspond to the wheel-house, the front seat being jumped forward to give admittance to the rear seat. Fig. 7 is a central vertical longitudinal section of Fig. 6, the front seat being shown as in the act of being jumped forward.

This invention relates to carriages formed with a wheel-house so that the front wheels pass beneath or cut under the body by reason of their extending a limited distance up into the same; and it consists in so constructing, attaching, and arranging the front seat that it can be jumped forward, upon jumping-irons that are pivoted to both the body and seat, so that said front seat will be at all times level whether it be in its rearward position or its forward position or when being jumped forward, as will be next herein pointed out in connection with the accompanying drawings, and then specifically defined in the appended claim.

Referring again to said drawings, A in the several views represents the body, and B in like manner is the rear seat. The wheel-house is shown at C and the front seat at D and is subdivided for convenience; but it may be either so constructed or it may be formed as an entire seat. The front seat or seats are connected with the body by the jumping-irons $b$, which at their lower ends are pivoted to the body, while at their top ends they join rigidly the horizontal irons $c$, which are hung to revolve freely in the eyes $d$, secured beneath the seat.

It will be obvious that with jumping-irons constructed in the manner shown by me two irons, one behind the other, for each half-seat will be sufficient, as the seat will have no play upon the irons $b$; but if for any reason four irons are desired they may be employed. It will also be apparent that said jumping-irons may be combined with either of the kinds of wheel-houses shown and that they may at the lower end be attached to the wheel-house or directly to the bottom of the carriage-body as the construction and style of the carriage may render most desirable.

Various changes in the style and form of both the body and seat may be made without departing from the spirit of my invention, which essentially consists in combining with a carriage formed with a wheel-house front seat or seats provided with jumping-irons upon which the seat moves back and forth (from rear to front and the reverse) in a level position at all times.

I do not claim a carriage-body formed with a wheel-house, nor do I, in the abstract, claim a jump-seat; but What I do claim is—

A carriage having a wheel-house to admit the cut under of the front wheels and the front seat or seats having attached thereto a section of the side panel formed to correspond with the wheel-house and provided with jumping-irons upon which said seat may be moved forward and rearward while maintaining a level position, substantially specified.

AUGUSTUS N. PARRY.

Witnesses:
GEORGE H. BRIGGS,
DELL W. DOLBIER.